United States Patent [19]
Kormanyos et al.

[11] Patent Number: 5,472,470
[45] Date of Patent: Dec. 5, 1995

[54] GLASS SHEET PRESS FORMING AND QUENCHING RING

[75] Inventors: Kenneth R. Kormanyos, Sylvania; Robert G. McMaster, Elmore; Jeffery A. Grzeszczak, Toledo; Thomas L. Shaw, Upper Sandusky, all of Ohio

[73] Assignee: Glasstech, Inc., Perrysburg, Ohio

[21] Appl. No.: 250,544

[22] Filed: May 27, 1994

[51] Int. Cl.⁶ .......................... C03B 23/02; C03B 27/00
[52] U.S. Cl. ................. 65/287; 65/289; 65/348; 65/374.13
[58] Field of Search .................. 65/273, 287, 289, 65/348, 374.1, 374.13

[56] References Cited

U.S. PATENT DOCUMENTS

| | | | |
|---|---|---|---|
| 2,297,315 | 9/1942 | Owen | 65/287 |
| 3,408,173 | 10/1968 | Leflet, Jr. | |
| 3,459,526 | 8/1969 | Stickel et al. | |
| 3,741,743 | 6/1973 | Seymour | 65/287 |
| 4,263,035 | 4/1981 | Dorey | 65/348 |
| 4,525,196 | 6/1985 | Fecik et al. | 65/287 |
| 4,556,408 | 12/1985 | Fecik | 65/273 |
| 4,678,495 | 7/1987 | Yoshizawa | 65/287 |
| 4,749,399 | 6/1988 | Yamada et al. | 65/273 |
| 4,830,650 | 5/1989 | Kelly | 65/287 |
| 5,069,703 | 12/1991 | d'Iribarne et al. | 65/104 |
| 5,086,907 | 2/1992 | Nitschke et al. | 65/289 |
| 5,090,989 | 2/1992 | Adoline | 65/273 |
| 5,118,335 | 6/1992 | Claassen et al. | 65/348 |

Primary Examiner—David L. Lacey
Assistant Examiner—Steven P. Griffin
Attorney, Agent, or Firm—Brooks & Kushman

[57] ABSTRACT

A glass sheet pressing and quenching apparatus including an open center ring having a shape generally corresponding to the shape of the glass sheet and a top support surface extending generally horizontally and conforming to the desired surface contour of the glass sheet. A plurality of flat insulating platelets are removably mounted on the top support surface to define an accurate glass contact surface having low thermal conductivity. The insulating platelets may include a plurality of horizontally inwardly spaced projections with passageways therebetween for communicating quench air therethrough. The ring is mounted on a support frame via a plurality of leveling assemblies, each of which include a mounting plate secured to the ring and adapted to receive a threaded connector having a spherical end portion which is mounted for limited movement within a generally spherical mounting receptacle secured to the support frame. One or more slots are cut into the threads, parallel to the center line of the connector. A spring loaded plunger is mounted in the mounting plate to interfere with the slots in the shaft, thereby providing a detent. The shape of the ring can be modified by controlled adjustment of one or more of the leveling assemblies.

13 Claims, 5 Drawing Sheets

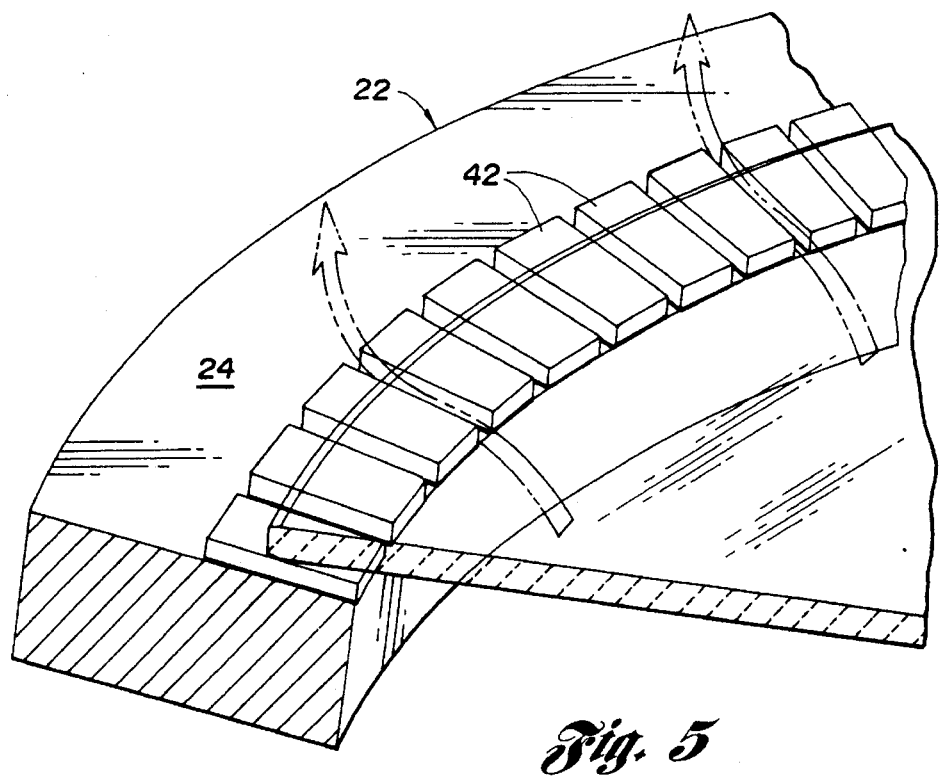
Fig. 5
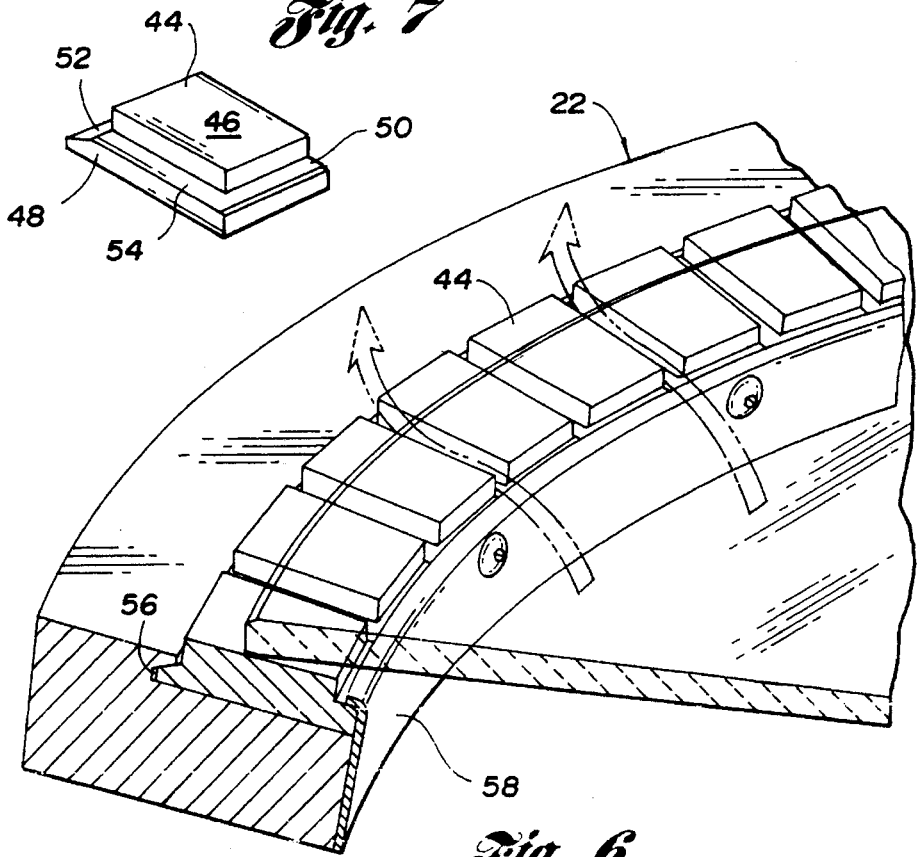
Fig. 7
Fig. 6

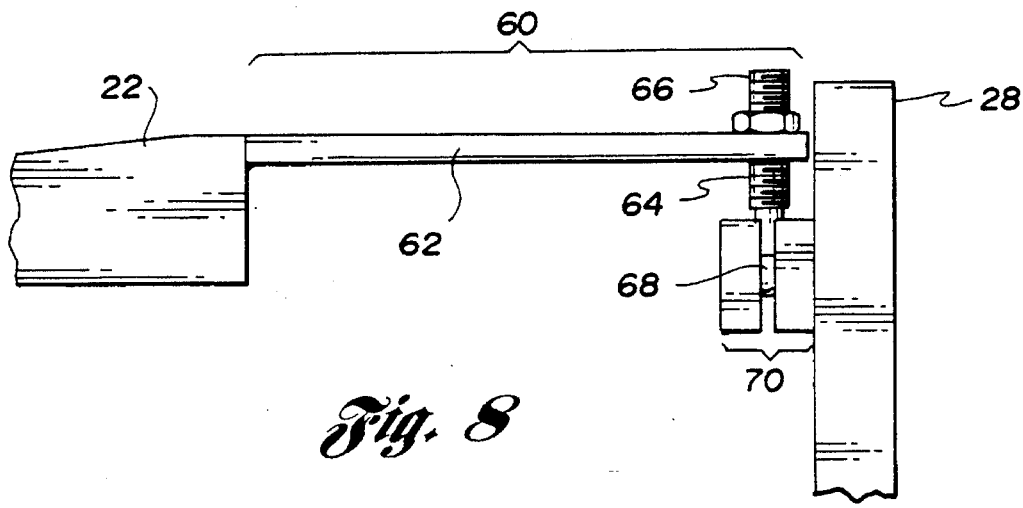
Fig. 8
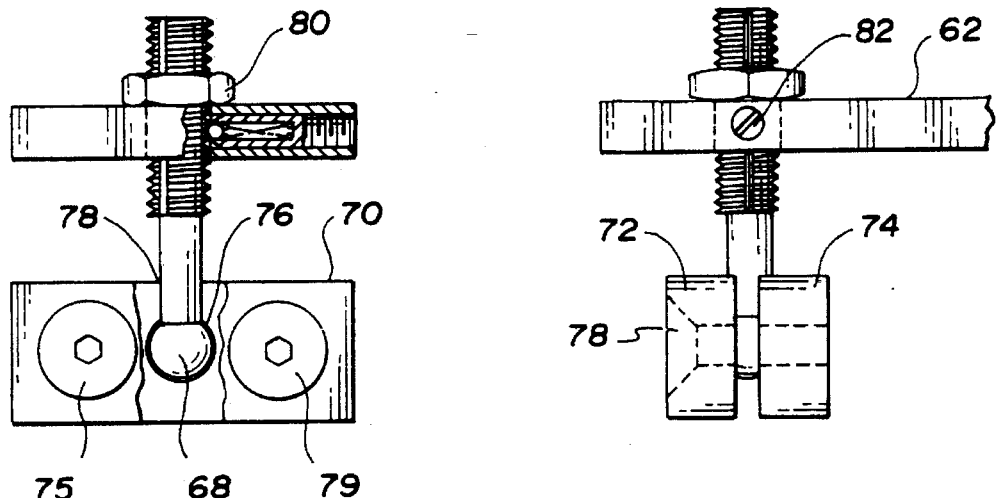
Fig. 11
Fig. 9
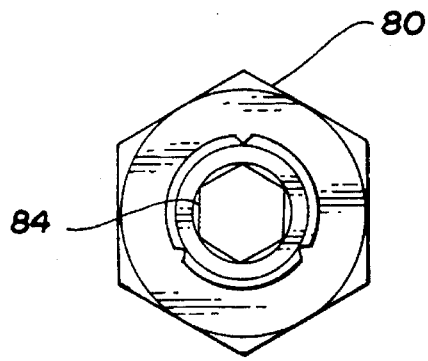
Fig. 10

5,472,470

GLASS SHEET PRESS FORMING AND QUENCHING RING

TECHNICAL FIELD

This invention relates to a glass sheet press forming and quenching apparatus including an open center ring.

BACKGROUND ART

Systems for press forming glass sheets for use, for example, as automotive windshields, sidelites and/or backlites, may include one or more stations at which glass sheets heated to the softening point of glass are press formed between upper and lower molds into a desired shape (either in the heated ambient or outside the heated ambient), and quenching stations into which the press formed glass sheet is transported for controlled application of a cooling medium (such as air) to the glass sheet to introduce stresses into the sheet adequate for inducing a desired break pattern should the glass break.

In some of these press forming systems, the lower mold is an open center ring which supports the peripheral edge of the glass sheet during press forming. Existing systems also often utilize the same glass sheet support ring to transport the glass sheet to the quench station and support the glass sheet therein during quenching. However, existing rings have proven unsatisfactory in part because the demand for, and development of, more complex shaped automotive lites, and because of decreasing tolerances required for these parts to meet with improved fit and finish standards.

In particular, existing pressing and quenching rings typically employ designs which limit the amount of contact between the supporting surface of the ring and the glass sheet to allow as much of the quenching medium to impinge on as much of the glass sheet surface as possible. For example, rings often employ spaced-apart metal projections which are covered with a screen or wire mesh to limit the ring surface area in contact with the glass sheet. U.S. Pat. No. 3,741,743 discloses a glass sheet shaping frame which utilizes a heavy wire mesh and a fine wire mesh mounted thereon. Another existing design utilizes a wrap of insulating material on the ring to limit the heat transfer between the glass sheet and the relatively cooler support ring which can result in uneven tempering of the edge. U.S. Pat. No. 4,525,196 discloses glass sheet handling devices, including a quench ring, provided with glass sheet engaging surfaces composed of a phenolic resin reinforced with fibers of an aromatic polyamide composition.

Existing designs have proven inadequate in meeting the increasingly high tolerances required of curved automotive lites, since there is significant variation in the surface configuration of the pressing ring due to the imprecise fit, bending and/or fracture of the wire mesh screens and/or cloth on the pressing/quenching ring. Also, it is increasingly difficult to fabricate and install press rings having pressing surfaces matching the complex design contour of the glass within more demanding tolerances. And, even when fabricated within tolerance, the ring may warp slightly (i.e., ±3 mm over the perimeter or ±6 mm across the major dimension of the part) during installation and/or after extensive use. Thus, a need exists for a method for fabricating press/quench rings having a more accurate pressing surface, and for providing for field tuning of the shape of the ring, when required, to produce parts within design tolerances.

DISCLOSURE OF INVENTION

It is, therefore, one object of the present invention to provide an improved pressing/quenching apparatus including a ring having a pressing surface which accurately matches the design contour of the glass sheet.

It is another object of the present invention to provide a pressing/quenching ring which may be utilized in both in-furnace and extra-furnace press forming of glass sheets and subsequently support the formed glass sheet during tempering to obtain correct, even edge tempering of the glass sheet.

It is another object of the present invention to provide a glass sheet pressing/quenching ring including a glass sheet support surface capable of press forming the sheet to the design contour within tolerances without part-to-part variance due to deflection of the supporting surface.

It is yet another object of the present invention to provide a glass sheet pressing and quenching ring including a surface which contacts the heated glass sheet with a material having a low thermal mass and low thermal conductivity to avoid chill cracks in the glass resulting from rapid cooling of the glass edge during pressing on the ring at the forming station.

It is yet another object of the invention to provide a glass sheet pressing/quenching ring including a glass sheet contacting surface which can be quickly and easily repaired or replaced without departing from the design contour of the glass sheet being formed thereby.

It is yet another object of the invention to provide a glass sheet pressing/quenching ring which can be quickly and easily installed and adjusted on site for initial and continued compliance with the design tolerances of the part formed therewith.

It is yet another object of the invention to provide a method for fabricating a number of glass sheet pressing/quenching rings having the same contoured glass contact surface to substantially reduce the variation in shape of parts manufactured with different rings. Highly accurate surface contours can be achieved by deriving CAD data for the top support surface of the ring from the CAD data developed to define the contacting portion of the surface of the glass part. This data can be used as the input to machine the pressing surface using computer aided machining, resulting in an accurately machined surface contour which can be replicated when multiple rings are utilized to fabricate the same part.

In carrying out the above objects and other objects of the invention, the pressing/quenching apparatus of the present invention includes an open center ring having a shape generally corresponding to the shape of the glass sheet and a top support surface extending generally horizontally inwardly and conforming to the desired surface contour of the glass sheet, a plurality of flat insulating platelets removably mounted on the top support surface and defining a glass contact surface including a plurality of horizontally inwardly spaced projections with passageways therebetween for communicating quench air therethrough.

The ring is mounted on a support frame via a plurality of leveling assemblies, each of which include a mounting plate secured to the ring and adapted to receive a threaded connector shaft having a spherical end portion which is mounted for limited movement within a generally spherical mounting receptacle secured to the support frame. One or more slots are cut into the threads parallel to the center line of the connector. A spring loaded plunger is mounted in the mounting plate for insertion into one of the slots on the connector. Controlled adjustment of the leveling assembly can be achieved by turning the threaded connector until the plunger snaps into place in one of the slots as a detent after the desired rotation.

The insulating platelets are preferably fabricated from a material such as a melamine and fiberglas composite or a polyimide and graphite composite. The projections are preferably rectangular or trapezoidal in shape to facilitate ease of construction.

The method of making the pressing/quenching apparatus includes fabricating the support frame and ring from suitable bar stock, generally conforming the ring to the shape of the glass sheet, machining the top support surface of the ring to conform within applicable tolerances to the design contour of the surface of the glass sheet being supported thereby, and releasably mounting the insulating platelets on the contacting surface to define the appropriate pressing surface contour which includes inwardly spaced projections with passageways therebetween for communicating the quenching medium therethrough during quenching.

The above objects, and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a perspective view of a section of an alternative embodiment of a pressing/quenching ring;

FIG. 6 is a perspective view of a section of an alternative embodiment of a pressing/quenching ring;

FIG. 7 is a perspective view of one of the platelets utilized in the pressing/quenching ring of FIG. 6;

FIG. 8 is a partial side view of the pressing/quenching ring including one of the leveling assemblies connecting the ring to its support frame;

FIG. 9 is a side view of a section of the leveling assembly of FIG. 8;

FIG. 10 is the top view of the lock nut and connector utilized by the leveling assembly;

FIG. 11 is the end view of the leveling assembly of FIG. 8; and

BEST MODE FOR CARRYING OUT THE INVENTION

Figure 1:
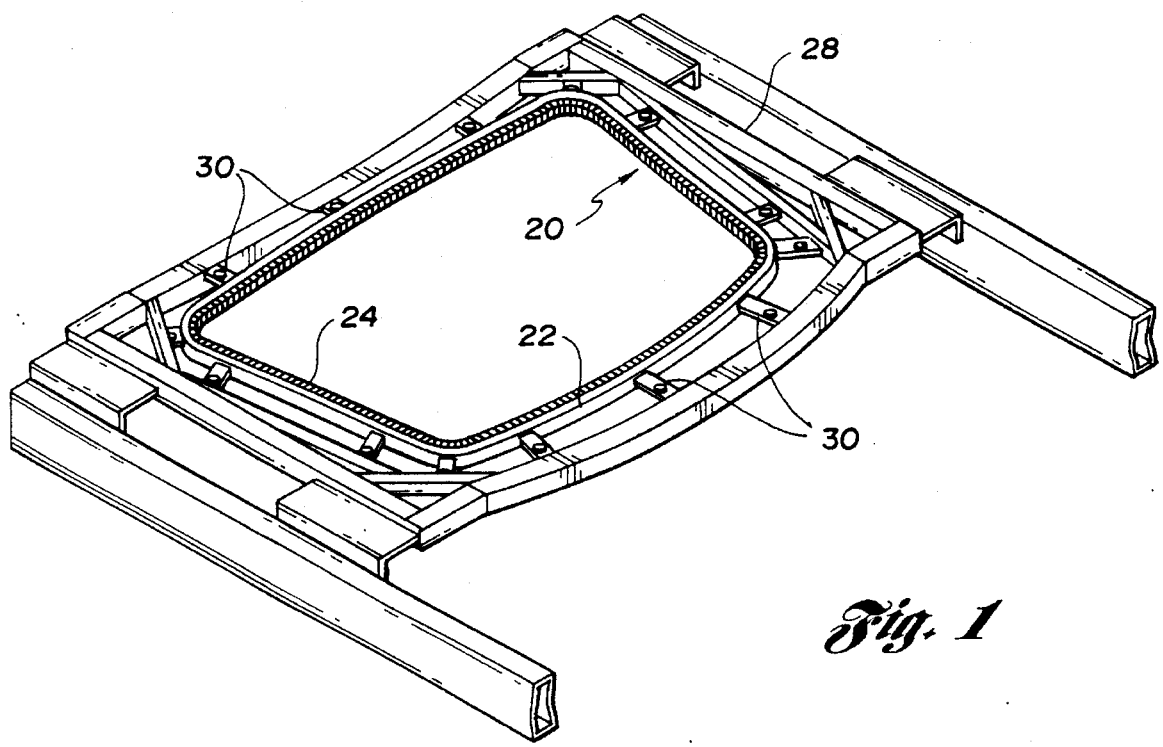
FIG. 1 is a perspective view of a pressing/quenching apparatus constructed in accordance with the present invention.
Figure 2:
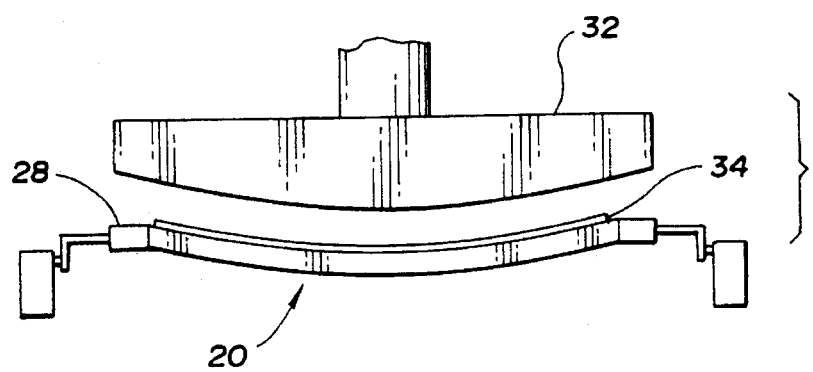
FIG. 2 is a schematic illustration of an upper full-face glass sheet shaping mold for press bending the heated glass sheet between the shaping mold and the pressing/quenching ring of the present invention.
Figure 3:
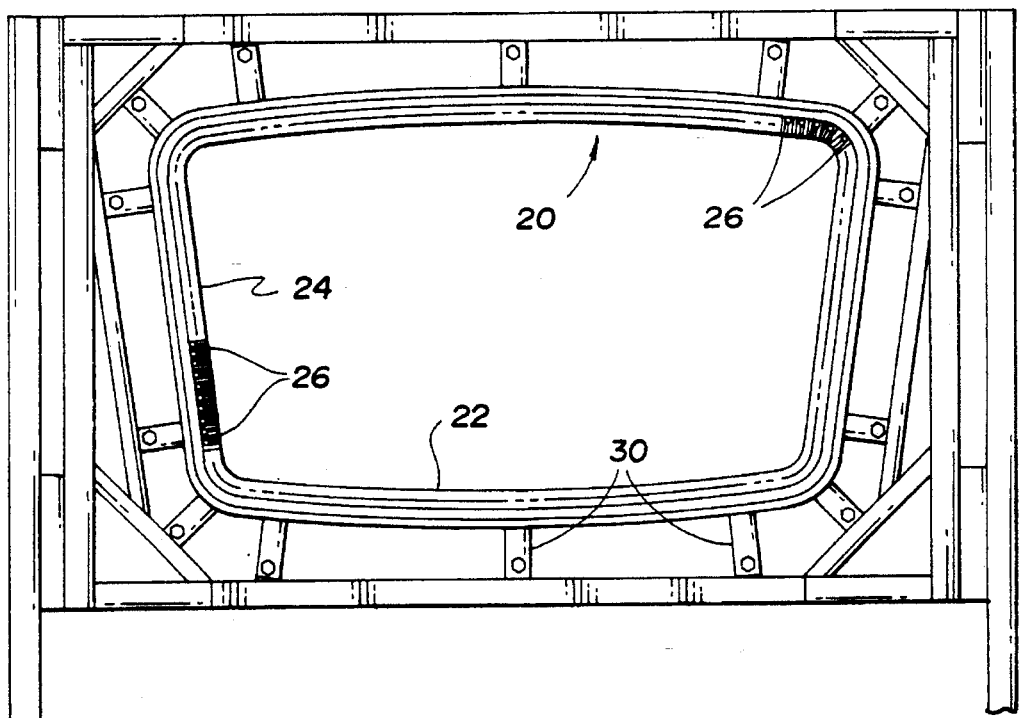
FIG. 3 is a plan view of the pressing/quenching ring shown in FIG. 1.

Referring to FIGS. 1–3, the glass sheet pressing and quenching apparatus constructed in accordance with the present invention, generally indicated by reference numeral 20, includes an open center ring 22 including a top support surface 24 extending generally horizontally inwardly and conforming to the desired surface contour of the glass sheet. The pressing surface includes a plurality of insulating platelets 26 removably mounted on the top support surface 24, providing a rigid, well-defined pressing surface having a low thermal conductivity. The pressing and quenching ring is mounted on a support frame 28 via a plurality of leveling assemblies 30, each of which can be quickly and easily adjusted during and after installation of the ring 22 to provide precise tuning of the ring required to conform the press formed glass sheets within their design tolerances.

When used in combination with a full-face shaping mold 32, the pressing and quenching apparatus 20 press forms a heated glass sheet 34 between the full-face mold 32 and the pressing surface of the ring 22. The pressing and quenching apparatus 20 subsequently also supports the press-formed glass sheet during the quenching operation to provide a uniform heat strengthened or tempered pattern with greatly reduced edge cracking and high reflective edge quality. The support frame 28 is preferably a shuttle operably connected to a suitable actuator (not shown) to provide the desired horizontal and/or vertical movement of the pressing and quenching apparatus to receive the glass sheet, press form it against the upper full-face mold 32, convey the press formed sheet to a quenching station, and support the glass sheet as it is cooled in the quenching station to its desired degree of heat strengthening or temper. The glass sheet is typically transferred to the shuttle from its position on a conveyor within a furnace, once having been heated to the desired temperature for forming. Various known transfer mechanisms may be utilized, such as those disclosed in U.S. Pat. Nos. 4,615,724; 4,204,854; or 4,202,681, each of which are incorporated herein.

Figure 4:
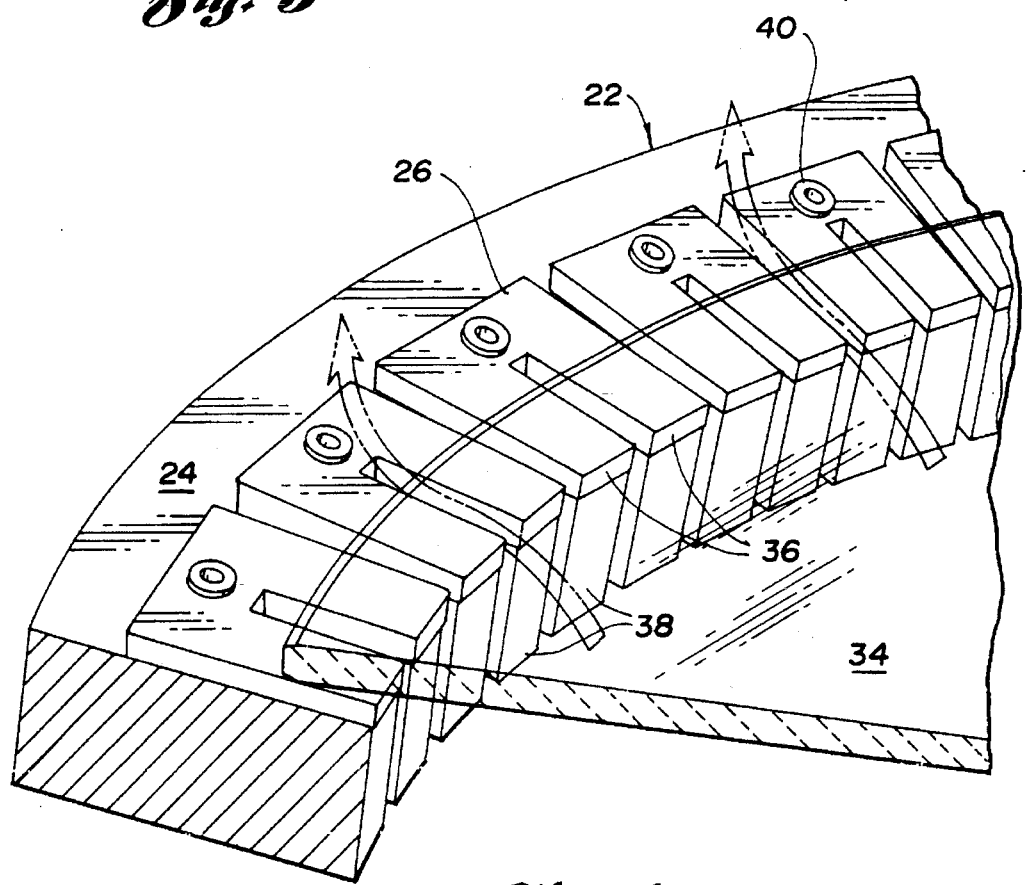
FIG. 4 is a perspective view of a section of the ring of FIG. 1 illustrating the pressing surface with the glass sheet thereon.

Referring to FIGS. 3 and 4, the ring 22 is made of a rigid machinable material, such as carbon steel which can be CAM machined on the top support surface 24 to the precise design contour of the glass sheet and firmly support and transport the glass sheet during press bending and quenching. The insulating platelets 26 are removably mounted on the top support surface 24 to define a glass contact surface including a plurality of horizontally inwardly spaced projections 36 with passageways therebetween for communicating quench air therethrough during quenching. In the embodiment shown in FIG. 4, the ring 22 also includes a plurality of inwardly projecting spaced support fingers 38 substantially identical in shape and size to the spaced projections 36 so that when the insulating platelets 26 are mounted on the top support surface 24 of the ring 22, the air passageways extend through the entire thickness of the ring 22. The ring 22 is slightly larger than the size of the glass sheet so that, upon accurate positioning of the glass sheet 34 on the ring 22, the glass sheet contacts only the surface of the insulating platelets 26 over the area including the passageways.

The support fingers 38 of the rigid ring 22 are of sufficient strength to resist distortion and deflection during press bending. The insulating platelets define a sheet pressing surface which retains the desired high precision contour of the top support surface 24 while at the same time providing a contact surface having low thermal conductivity. Moreover, the insulating platelets 26 are of a relatively hard, planar, lubricous material, yielding the combined advantages of rigid support during press forming, low thermal conductivity during support of the glass sheet on the ring, and less scratching of the sheet as it is loaded, press-formed and unloaded. As will be appreciated by those skilled in the art, the low thermal conductivity of the glass contacting surface limits the heat loss from the glass sheet to the contact surface of the ring. It has been found that the pressing and quenching ring of the present invention is capable of accurately press forming glass as thin as 3.2 mm without experiencing the chill cracking around the edges as often previously resulted. This is of particular importance in glass forming systems which heat the glass sheet to softening in a furnace section, then transport the sheet to form it out of the heated ambient of the furnace. As will also be appreciated by those skilled in the art, the lower thermal conductivity of the contacting surface of the ring also provides for more even cooling of the glass sheet in the quench.

A preferred material for the insulating platelets 26 is a G-9 melamine-fiberglass composite. Another suitable material for the insulating platelets 26 is a polyimide and graphite composite material, such as is sold under the trade name of Vespel® SP-22 by the DuPont Company. In the embodiment of FIG. 4, the insulating platelets 26 are generally U-shaped. The spaced projections 36 may be generally rectangular, trapezoidal or of any other shape suitable for providing a support surface adequate to accurately press form the glass sheet 34 while at the same time limiting the glass sheet contacting area to limit thermal exchange between the relatively hotter glass sheet and the relatively cooler ring, and provide adequate flow of the air (or other quenching medium) over the surface of the edge portions of the glass sheet 34 during quenching. In this embodiment, the shape of the spaced projections is substantially identical to the shape of the support fingers 38 on the ring, thereby providing a flow of air through the entire thickness of the ring in the area where the glass sheet is supported by the ring. The spaced projections 36 and space support fingers 38 generally have a pitch in the range of between 4.26 mm and 5.26 mm, and preferably about 4.76 mm. The width of the fingers in the range of between 2.13 mm and 2.63 mm, and preferably about 2.38 mm. The insulating platelets 26 generally have a thickness of about 1.5 mm to 1.8 mm, and the spaced support fingers 38 on the ring have a thickness in the range of 15.8 mm to 19.0 mm. Of course, it should be understood that the relevant dimensions of the insulating platelets 26 and the support ring 22 may be varied so long as the design objectives of rigidity and strength for repeated accurate press forming and low thermal conductivity during quenching are achieved.

The insulating platelets 26 are preferably replaceably mounted on the press surface 24 of the ring 22. In the embodiment shown in FIG. 4, conventional pop rivets 40 are used for this purpose. One advantage of using pop rivets is that the platelets 36 can be accurately and tightly mounted on the ring 22, yet individual platelets 36 can be quickly removed (such as by drilling out the rivet) and replaced when cracked or worn. Of course, many other conventional fastening means may be used, such as screws, adhesives (shown in FIG. 5), retainer assemblies (shown in FIG. 7) or other conventional fasteners suitable for tightly securing the insulating platelets 36 in place on the ring 22 while at the same time providing for quick and easy replacement of individual platelets as required.

A positioner (not shown) accurately positions the glass sheet on the support surface of the ring 22 so that the functionality of the air passageways is maintained. The positioner may include a plurality of air actuated cylinders, such as the type disclosed in U.S. Pat. No. 5,090,989, which is hereby incorporated herein. Alternatively, the positioner may be of the type shown in U.S. Pat. No. 4,775,404 which is also hereby incorporated herein, or the glass may be positioned with conventional mechanically activated locators, or by other positioning means known in the art. The glass sheet generally extends outwardly on the spaced projections to be supported thereon over about 6.35 to 12.7 millimeters, and preferably about 9.525 millimeters, of the inward most portion of the spaced projections 36 of each of the platelets 26.

FIG. 5 illustrates an alternative embodiment of the ring 22 including a pressing support surface 24 and insulating platelets 42 having a different geometry. As illustrated, the ring itself does not include the spaced support fingers of the embodiment of FIG. 4. This further simplifies construction of the ring, since the step of machining or sawing the slots (to define the support fingers) is eliminated. The insulating platelets 42 are also of a simpler, generally rectangular or trapezoidal design. The platelets 42 are again removably mounted on the ring 22. In this embodiment, an adhesive, such as a heat curable polyimide adhesive, may be used for this purpose. The insulating platelets 42 are positioned so as to define passageways between the individual platelets for flow through of the quenching medium. Of course, the insulating platelets 42 must be sufficiently thick so as to provide an adequate flow channel for the quenching medium to obtain a correct edge temper without the use of the finger structure of the embodiment shown in FIG. 4.

Referring to FIGS. 6 and 7, another embodiment of the ring 22 is illustrated including a different mounting means including insulating platelets 44 of an alternate shape which facilitates use in this mounting arrangement as well as facilitating quick and accurate spacing of the insulating platelets during fabrication of the ring 22 or during subsequent replacement of one or more of the insulating platelets 44 in the field. In this embodiment, the insulating platelets are fabricated from the above-described suitable material into the configuration of FIG. 7 which includes an upper portion 46 having a relatively planar surface and uniform thickness, and a base portion 48 having a generally rectangular shape but larger in its major dimensions than the upper portion 46. The larger base portion 48 includes an in-board shoulder 50 and an out-board shoulder 52, as well as a lateral spacer portion 54. A notch 56 of sufficient size and shape to provide seating of the out-board shoulder 52 of each of the platelets 44 is provided around the entire perimeter of the ring as shown in FIG. 6. A retainer strip 58 is releasably secured on the inner edge of the ring 22 around its perimeter. The retainer strip is configured with a lip which, upon installation of the retainer strip on the ring, extends over the in-board shoulder 50 of each of the insulating platelets 44 tightly securing them into position. The lateral spacer 54 (which may be on one or both sides of the base) is of sufficient width to space the adjoining insulating platelets from each other enough to define the flow through passageways desired for correct proper quenching.

Referring to FIGS. 8–11, the ring 22 is mounted on the support frame 28 via a plurality of leveling assemblies 60. The leveling assemblies include a generally planar rectangular mounting plate 62 which is fixedly secured, such as by welding, at one end to the ring 22 and extends generally normal to the perimeter of the ring. The mounting plate includes a threaded aperture at the out-board end of the mounting plate through which a threaded connector shaft 64 may be installed in a generally vertical orientation. The connector shaft has a threaded portion 66 at one end and a generally spherical portion 68 at the opposite end. A mounting receptacle 70 comprising a pair of mounting plates 72 and 74 into which a generally spherical socket 76 and generally cylindrical shaft clearance opening 78 are defined is secured to the support frame 28. In the embodiment of FIGS. 8–11, mounting plate 74 is welded to the support frame 28 and mounting plate 72 is subsequently secured via conventional fasteners 75 and 79 to the other mounting plate 74 with the spherical portion 68 of the connector shaft mounted therebetween in the socket 76. A lock nut 80 is tightened into position over the threaded portion of the connector shaft on the opposite side of the mounting plate 62 to secure the mounting plate, and thereby secure the ring 22 in the desired position.

One or more slots are cut in the threaded portion 66 parallel to the center line of the connector shaft 64. A spring plunger 82 is mounted within a suitable threaded opening in the side of the mounting plate 62 so that, when properly adjusted, the ball of the spring plunger 82 projects into the threaded aperture on the mounting plate 62 and into one of the slots to provide a detent. Easy accurate adjustment of any one or more of the leveling assemblies 60 is achieved by loosening the lock nut 80 and rotating the connector shaft a selected number of turns or portions of turns of the connector shaft (which can be accurately determined by counting the clicks of the spring plunger). For example, if the pitch of the threaded portion 66 of the connector shaft 64 is 1 mm and the connector shaft 64 has a single slot machined therein, rotating the connector until the spring plunger clicks into position in the slot (i.e., one complete rotation) would adjust the ring 22 plus or minus 1 mm. In one embodiment, the threaded portion 66 has a pitch of 1.5 mm, and three equi-distant slots are cut into the connector 64, so that adjustments of 0.5 mm per click (i.e., rotation from one slot to the next adjoining slot in either direction) obtains a generally vertical adjustment of plus or minus 0.5 mm. By varying the pitch of the thread and the number of slots, of course, any minimum incremental adjustment can be obtained.

As shown in FIG. 10, the connector shaft 64 is provided with a hexagonal socket 84 at the end nearest the threaded portion 66, into which an adjusting wrench may be inserted to rotate the connector shaft 64 for adjustment as described above. Alternatively, a square, hexagonal or other suitably shaped head could be machined to protrude from the end of the threaded portion of the connector shaft to allow for socket-type wrenches to be utilized to facilitate the adjustment.

It will be appreciated that the spherical end 68 and socket 76 mount of the connector shaft on the support frame 28 allows for limited movement of the connector shaft so that the otherwise rigid ring can be slightly repositioned (or warped) relative to the support frame 28 by adjustment of the mounting plate 62 on the threaded portion 66 of the connector shaft 64 for one or more of the leveling assemblies 60. As described above, precise and accurate field tuning of fractions of a millimeter can be obtained at selected points about the periphery of the ring 22 without disassembly of the ring 22 and support frame 28. It should also be noted that limited clearance of the spherical portion 68 of the connector shaft 64 within the socket 76 (about 0.127 mm) and of the cylindrical portion of the shaft within the shaft clearance opening (about 0.5–1 mm) 78 on the mounting receptacle 70 is required.

To construct the pressing and quenching apparatus 20 of the present invention, the support frame can be fabricated from bar stock of carbon steel or other material of suitable strength, rigidity and ability to withstand the range of thermal stresses involved in glass sheet heating, forming and quenching, by welding or other conventional fabricating means. The ring 22 can also be manufactured from steel bar stock bent and/or welded into the general shape of the glass sheet to be pressed therefrom. In the embodiment of FIGS. 1, 3 and 4, slots or channels defining the spaced support fingers 38 are saw cut or otherwise machined into the in-board edge of the ring 22, preferably before the bar stock is bent and welded. These channels are then filled with a filler material such as an epoxy to provide support between the fingers during subsequent machining.

The ring is then mounted in the support frame with each of the leveling assemblies preferably adjusted to about their mid-point. The support frame and ring are each then welded into position on the machine fixture of a milling machine, such as a conventional ball end mill. The top support surface 24 is then machined on the end mill (or other conventional CAM machinery suitable for cutting the desired contour surface on the ring).

Figure 12:
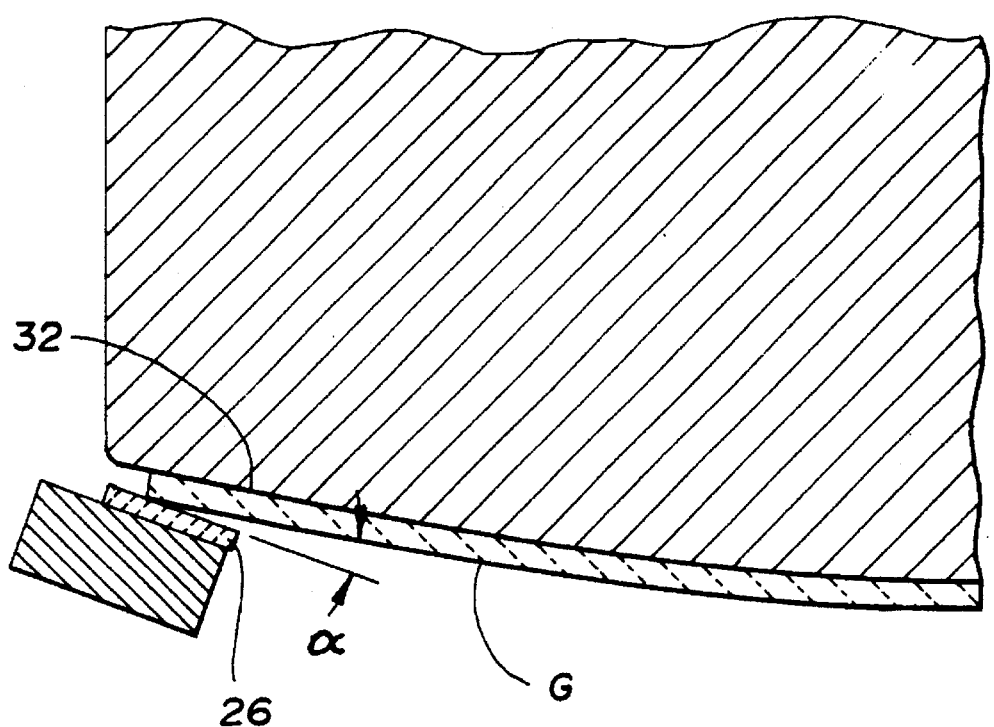
FIG. 12 is a diagram illustrating the relationship of the glass sheet to the pressing surface of the ring and the surface of the upper mold during press forming.

Referring to FIG. 12, the shape of the top support surface 24 is preferably derived from the CAD data describing the exact contour of the surface of the desired part. The CAD data for the part is first utilized to develop a description of the surface of the upper mold 32. Offsets equal to the thickness of the glass sheet G and the thickness of the insulating platelets are applied to the CAD data describing the upper mold surface to develop the description of the top support surface 24 of the ring. Again, this surface is preferably developed using a conventional CAD system. It should be noted that since it is desirable to contact the glass sheet only on its edge during press forming, the CAD data is further modified so that the top support surface 24 of the ring 22 is angled, preferably at about 5°–15°, relative to the surface of the upper mold and glass sheet. By maintaining this contact angle, marking of the periphery glass sheet during the press forming operation is substantially eliminated.

Following machining of the top support surface 24, the epoxy filler is removed. The ring and support frame 28 is then removed from the machining fixture and the insulating platelets are installed thereon. The pressing and forming apparatus 20 is then ready for installation in the glass sheet press forming and quenching system in which it is to be utilized.

It will be appreciated that by welding each support frame and ring assembly in an identical fashion on the end mill machine fixture, the pressing and quenching apparatus 20 can be replicated with great accuracy. This significantly reduces the part-to-part variation found in glass sheet parts fabricated on the same forming equipment using different rings.

While the best modes for carrying out the invention have been described in detail, those familiar with the art to which this invention relates will recognize various alternative designs and embodiments for practicing the invention as defined by the following claims.

We claim:

1. An apparatus for supporting a glass sheet during press forming, the apparatus comprising:

a support frame;

an open-center ring having a shape generally corresponding to the shape of the glass sheet and including, a top support surface extending generally horizontally inwardly and having a surface that conforms to the desired shape of the surface of the perimeter of the glass sheet, and a plurality of insulating platelets removably mounted on the top support surface, the platelets defining a glass pressing surface having low thermal conductivity and which accurately conforms to the desired shape of the glass sheet; and a plurality of levelling assemblies connecting the ring to the support frame, each levelling assembly comprising, a mounting plate secured to the ring and extending outwardly in a generally horizontal direction and including a threaded aperture at the end of the plate opposite the end secured to the ring, a mounting receptacle secured to the support frame and defining a partially spherical socket, and a connector shaft having a threaded portion at one end and a generally spherical portion at the other end, the threaded portion of the shaft adjustably secured to the mounting plate through the threaded aperture and the spherical portion mounted in the socket, providing for limited movement of the shaft within the mounting receptacle.

2. The apparatus of claim 1 wherein the insulating platelets are fabricated from a melamine-fiberglass composite.

3. The apparatus of claim 1 wherein the insulating platelets are fabricated from a polyimide and graphite composite material.

4. The apparatus of claim 1 wherein the insulating platelets are riveted on the top support surface of the ring.

5. The apparatus of claim 1 wherein the insulating platelets include a plurality of horizontally inwardly spaced projections defining passageways therebetween for communicating air therethrough.

6. The apparatus of claim 5 wherein the ring includes a plurality of inwardly projecting spaced support fingers substantially identical in shape and size to the spaced projections of the insulating platelets, and wherein the insulating platelets are mounted on the support fingers such that the air passageways extend through the entire thickness of the ring.

7. The apparatus of claim 1 wherein the insulating platelets are mounted on the top support surface to define a plurality of passageways for communicating quench air therethrough.

8. The apparatus of claim 1 wherein the threaded portion of the connector shaft includes at least one slot parallel to the center line of the connector shaft, and further including a spring plunger mounted in the mounting plate so as to project into the threaded aperture in the mounting plate and into the slot to provide a detent.

9. The apparatus of claim 1 wherein the connector shaft of each leveling assembly includes tool access means to provide for connection of a tool thereto to rotate the connector shaft for adjustment of the position of the mounting plate on the threaded portion of the shaft.

10. The apparatus of claim 9 wherein the tool access means is a hexagonal socket located at the end of the connector shaft nearest the threaded portion.

11. An apparatus for supporting a glass sheet during press forming and quenching, the apparatus comprising:

a support frame;

an open-center ring having a shape generally corresponding to the shape of the glass sheet and including a glass sheet pressing surface extending generally horizontally inwardly and having a surface that conforms to the desired shape of the surface of the perimeter of the glass sheet; and a plurality of leveling assemblies connecting the ring to the support frame, each levelling assembly comprising, a mounting plate secured to the ring and extending outwardly in a generally normal direction and including a threaded aperture at the end of the plate opposite the end secured to the ring, a mounting receptacle secured to the support frame and defining a partially spherical socket, a connector shaft having a threaded portion at one end of the shaft, the threaded portion including at least one slot parallel to the center line of the shaft, and a generally spherical portion at the other end, the threaded portion of the shaft adjustably secured to the mounting plate through the threaded aperture and the spherical portion mounted in the socket, providing for limited movement of the shaft within the mounting receptacle, and a spring plunger mounted in the mounting plate so as to project into the threaded aperture on the mounting plate to provide a detent when the slot on the shaft is rotated into alignment with the spring plunger.

12. The apparatus of claim 11 wherein the connector shaft of each leveling assembly includes tool access means to provide for connection of a tool thereto to rotate the connector shaft for adjustment of the position of the mounting plate on the threaded portion of the shaft.

13. The apparatus of claim 11 wherein the tool access means is a hexagonal socket located at the end of the connector shaft nearest the threaded portion.

\* \* \* \* \*